United States Patent [19]

Maaijwee

[11] 4,226,047
[45] Oct. 7, 1980

[54] RACKS FOR THE CULTIVATION OF MUSHROOMS AND SIMILAR FUNGI

[75] Inventor: Ludoricus C. Maaijwee, Waalwijk, Netherlands

[73] Assignee: Alcoa Nederland B.V., Drunen, Netherlands

[21] Appl. No.: 1,374

[22] Filed: Jan. 5, 1979

[30] Foreign Application Priority Data

Jan. 6, 1978 [NL] Netherlands ............... 7800190

[51] Int. Cl.³ ............................................. A01G 1/04
[52] U.S. Cl. ................................. 47/1.1; 47/18; 47/66
[58] Field of Search ............... 47/1.1, 18, 66, 39

[56] References Cited

U.S. PATENT DOCUMENTS

| | | | |
|---|---|---|---|
| 3,118,249 | 1/1964 | Bard et al. | 47/1.1 |
| 3,842,534 | 10/1974 | Walters et al. | 47/1.1 |

FOREIGN PATENT DOCUMENTS

| | | | |
|---|---|---|---|
| 2170840 | 9/1973 | France | 47/1.1 |
| 1428345 | 3/1976 | United Kingdom | 47/1.1 |

Primary Examiner—Robert E. Bagwill
Attorney, Agent, or Firm—Young & Thompson

[57] ABSTRACT

Rack for the cultivation of mushrooms and similar fungi, comprising superimposed troughs with side slats consisting of aluminum profiles and a bottom constituted by horizontal, extruded aluminum floor members running in transverse direction, through which members bars or tubes protrude.

7 Claims, 2 Drawing Figures

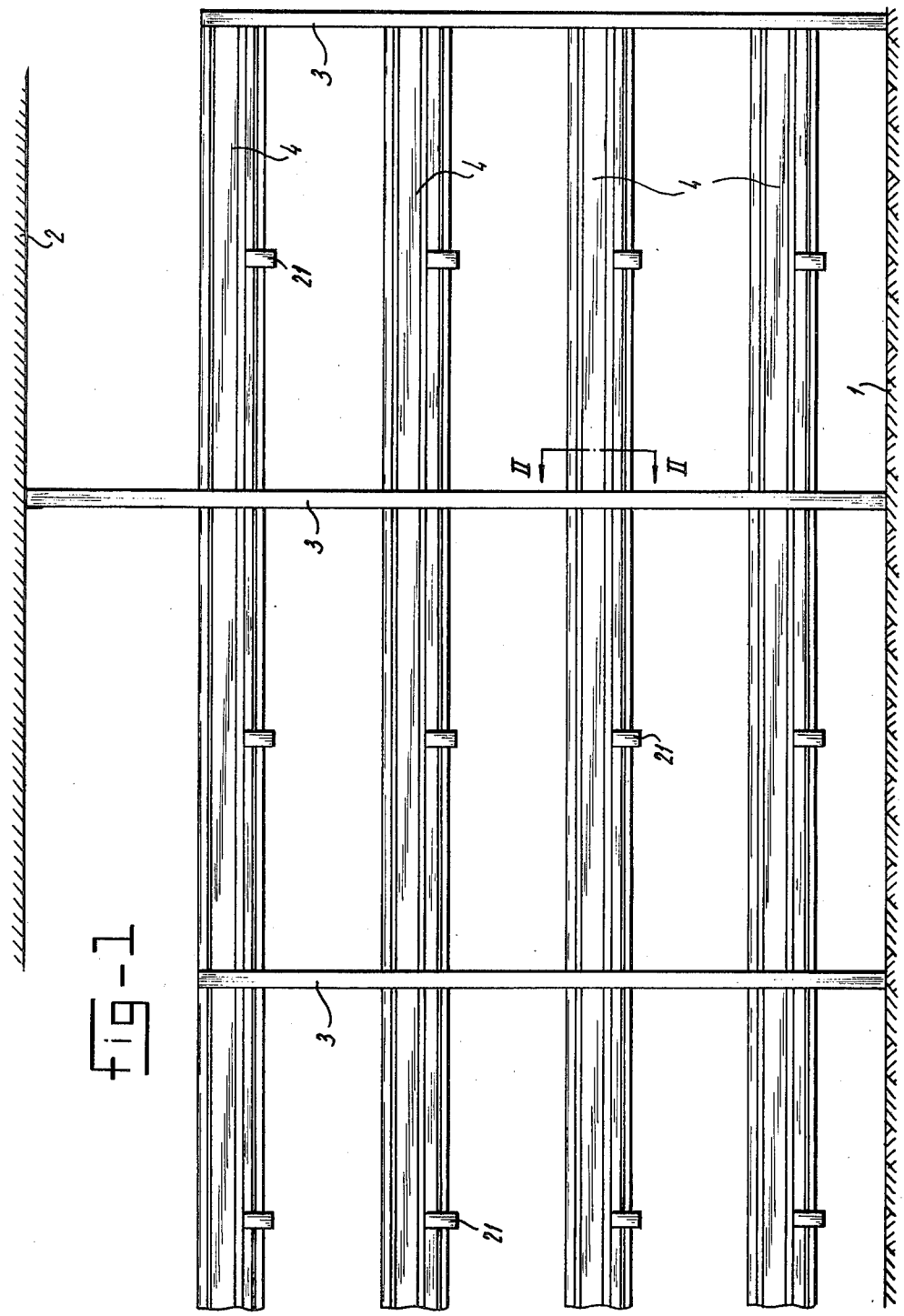

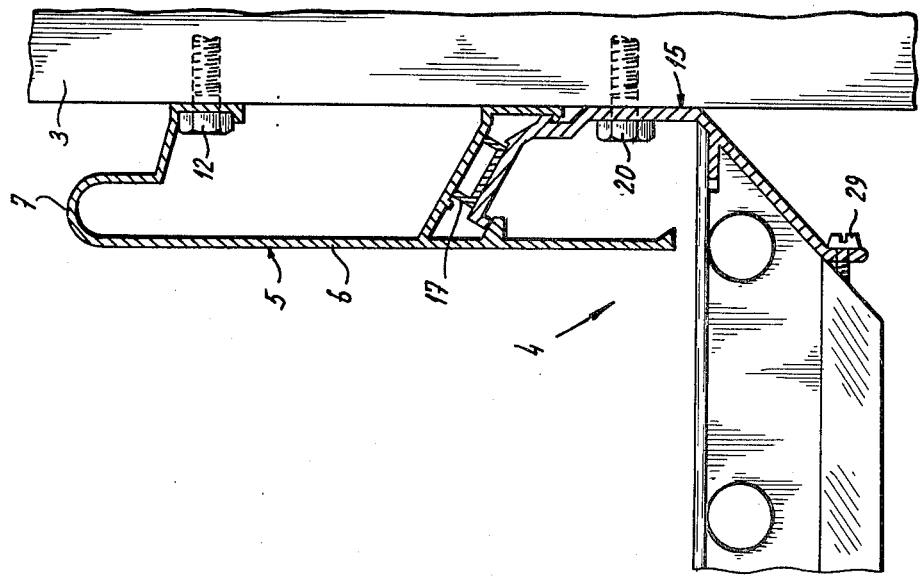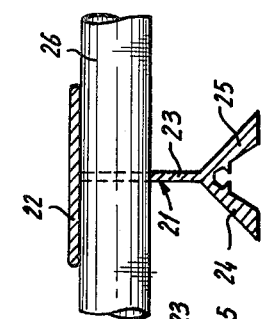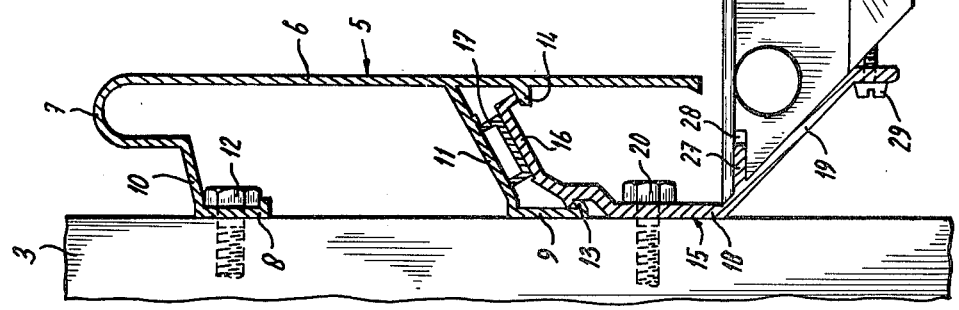

RACKS FOR THE CULTIVATION OF MUSHROOMS AND SIMILAR FUNGI

This invention relates to a rack for the cultivation of mushrooms and similar fungi, comprising vertical girders which have been mounted in two parallel planes, and troughs for the cultivation of the mushrooms, said troughs being superimposed horizontally and fixed between said girders and each one of said troughs comprising a bottom and side slats.

Racks of this kind are known in practice. Nowadays, there is a tendency towards more mechanisation in the cultivation of mushrooms and similar fungi.

In the cultivation of mushrooms, wooden troughs and a front-filling machine are being used, said machine may fill the troughs from one end with compost and a layer of manure. To this end, a rectangular layer of sheet material is pulled across the floor of the trough, carrying along the compost and the manure and the entire trough is, thus, being filled.

In the cultivation of mushrooms the compost is mixed with mycelium beforehand. After approximately four weeks the first flush of mushrooms is ready to be gathered by hand or mechanically. The next flushes are ready at intervals of one week. After several flushes the troughs must be emptied and disinfected in order to remove embryos of harmful moulds or viruses.

When the mushrooms are gathered mechanically, the picking machine is traversed along the upper edges of the side slats of the trough.

The use of wooden troughs has various disadvantages. Any harmful viruses that may be present—mushrooms are readily affected—attach to the wood so that the wooden troughs have to be taken out of the racks after each cultivation in order to be subjected to disinfecting operations.

The upper surfaces of the wooden side slats are not very flat, so that they cannot be used very well as rails for moving the picking machine or other processing machines, such as those used for flattening the surface.

Another drawback of the wooden floors of the troughs is that the floors tend to bend through in the form of a channel. After flattening the surface of the manure, the layer is thicker in the centre than along the side slats. Consequently, the growth of the mushrooms will be irregular in each trough.

It is the object of this invention to provide a rack, with which the aforementioned drawbacks are avoided.

In accordance with the invention, this object is achieved in that the side slats consist of extruded aluminum profiles to be secured to the inner sides of the girders and an upper edge lying at a distance from the girders, said edge may be used as rails, and a substantially vertical, flat inner wall extending from the upper edge till close to the bottom of the trough, that said bottom is constituted by horizontal, extruded aluminum members running in transverse direction, said aluminum members being connected to the side slats adjacent the girders, each one of said aluminum floor members comprising a top flange having a smooth surface and at least one vertical web provided with openings near the top flange, through which bars or tubes protrude, said bars or tubes connecting the floor members with each other and constituting the bottom of the trough together with the floor members, and that short sections of connecting members made of extruded aluminum connect the ends of the floor members to the side slats.

In using extruded aluminum profiles both for the floor and for the side slats, there is no need for disinfection, because the harmful viruses cannot attach to the profiles. It is, thus, only necessary to clean the racks by spouting.

The compost and the manure do not adhere to the smooth surfaces of the profiles.

The distance between the floor members may be chosen as desired.

One embodiment of the invention will now be described more in detail with reference to the drawings, wherein:

FIG. 1 is a side elevation of a section of a rack for mushrooms according to the invention; and FIG. 2 is a section along the line II—II of FIG. 1 at an enlarged scale.

Referring to FIG. 1 the floor of the cultivation room is indicated by reference numeral 1 and the ceiling is indicated by reference numeral 2. In a room of this kind, a number of racks according to the invention are generally placed side by side with pathways between them. Each rack comprises a number of vertical girders 3. The girders 3 have been disposed in two vertical, parallel planes and each time there are two girders 3 opposite to each other.

A number of troughs 4 is superimposed between the row of girders 3. The number of troughs 4 in a rack depends on the height available between the floor 1 and the ceiling 2 and on the room between the various troughs which is needed for moving picking machines or other processing machines over the upper surfaces of the troughs.

The construction of the trough according to the invention can be seen most clearly in FIG. 2.

Each side slat 5 is made of extruded aluminum profile. The side slat 5 comprises a flat main wall 6, a bent upper edge 7, flanges 8 and 9 and connecting members 10 and 11. As is apparent from FIG. 2, the flat wall 6 projects beyond connecting member 11.

The attachment flange 8 has been provided with openings, so that the side slat 5 can be connected to the girder 3 with the aid of bolts 12. The flange 9 has been provided with a bent edge 13, and wall 6 has an inwardly directed edge 14. The edges 13 and 14 act as receivers for a short piece of aluminum section 15, the edges of which section engage behind edges 13 and 14 and a clamping wedge 17 may be disposed between connecting member 11 of side slat 5 and member 16 of connecting section 15. In providing said wedge 17, sections 5 and 15 are rigidly connected to each other. Besides member 16, the connecting section 15 comprises a member 18, as well as a downwardly inclined member 19. Member 18 has been provided with holes; connecting section 15 may, thus, be connected to girder 3 with the aid of bolts 20.

The floor of the trough comprises substantially T-shaped cross members 21 and a top flange 22, a central web 23 and lower end portions 24 and 25 facing in different directions. The top flange 22 is slightly rounded off at the edges.

A number of round holes has been made in web 23 throughout the length of the floor members, said holes being set as close as possible to the top flange 22. Round tubes or rods 26 pass through said holes, so that each floor consists of a number of floor members 21 lying at a distance from each other, said members being connected by longitudinal round tubes 26.

The inclined ends of the floor members 21 are connected to connecting sections 15. For this purpose, a flange 27 of the connecting section engages in a slotted hole 28 of the floor member 21 and a Parker-bolt 29 has been screwed into an appropriate recess lying between the end portions 24 and 25 of the floor member 21.

When the rack is being mounted, firstly the side slats 5 are secured to the girders 3 by means of bolts 12 which pass through flange 8. Secondly, the connecting sections 15 are put up to the side slats 5 and connected thereto by applying clamping wedges 17. Subsequently, the connecting sections 15 are connected to the girders 3 and to the floor members 21 with the aid of bolts 20 and 29 respectively.

An additional floor member 21 is disposed preferably halfway up two girders 3, said floor member being hung up to the side slats 5 via connecting sections 15.

As is apparent from FIG. 2, the lower part of the inner wall 6 of each side slat 5 terminates at a distance above the top flange 22 of the floor members 21.

In operation, a rectangular layer of sheet material (not illustrated) is put on the floor members 21 and on the longitudinal tubes 26. When the layer is being pulled across the floor of the trough a compost layer with mycelium is placed hereon simultaneously; the compost layer is covered by a thin layer of manure. The upper edges 7 of the side slats 5 constitute a flat surface for moving a picking machine or another processing machine.

By using flat aluminum sections for the side slats and the floor, these members need not be disinfected after having been used, because any harmful viruses that may be present will not attach to the aluminum sections. These aluminum sections can easily be cleaned by spraying with water. The shape of the various sections is chosen such that the compost and manure will not easily attach or stick to the various parts, so that the process of cleaning is a very simple one.

The distance between the floor members can be altered as desired by disposing more or fewer floor members between the girders.

The cross-sectional shape of the floor members will prevent these members from bending under the weight of the compost layer.

All aluminum sections are constituted such that dirtying is limited to a minimum; i.e. the shape of the connecting members 10 and 11 is chosen such that any dirt falling thereon can easily be removed.

I claim:

1. Rack for the cultivation of mushrooms and similar fungi, comprising vertical girders which have been mounted in two parallel planes, and troughs for the cultivation of the mushrooms, said troughs being superimposed horizontally and fixed between said girders and each one of said troughs comprising a bottom and side slats, characterized in that the side slats consist of extruded aluminum profiles to be secured to the inner sides of the girders and an upper edge lying at a distance from said girders, said edge may be used as rails, and a substantially vertical, flat inner wall extending from the upper edge till close to the bottom of the trough, that said bottom is constituted by horizontal, extruded aluminum members running in transverse direction, said aluminum members being connected to the side slats adjacent the girders, each one of said aluminum floor members comprising a top flange having a smooth surface and at least one vertical web provided with openings near the top flange, through which bars or tubes protrude, said bars or tubes connecting the floor members with each other and constituting the bottom of the trough together with the floor members, and that short sections of connecting members made of extruded aluminum connect the ends of the floor members to the side slats.

2. Rack according to claim 1, characterized in that the connecting sections are clamped in the side slats with the aid of clamping wedges.

3. Rack according to claim 1, characterized in that the floor members are substantially T-shaped when seen in cross-section.

4. Rack according to claim 1, characterized in that the rods or tubes pass through openings in the web of the floor members, said openings being provided in the immediate proximity of and below the flanges of the floor members.

5. Rack according to claim 1, characterized in that one floor member has been disposed near every girder.

6. Rack according to claim 1, characterized in that at least one other floor member has been disposed between two girders.

7. Rack according to claim 1, characterized in that the substantially vertical, flat inner wall of every side slat terminates at a distance above the flanges of the floor members.

* * * * *